Nov. 1, 1938. D. B. DIMICK 2,135,103
LOCK JOINT SUBDRAINAGE PIPE
Filed Jan. 4, 1938 2 Sheets-Sheet 1
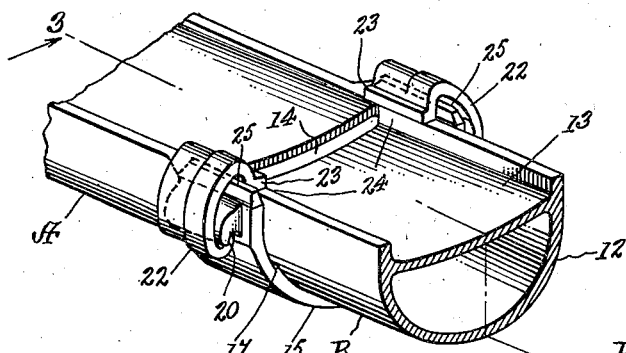
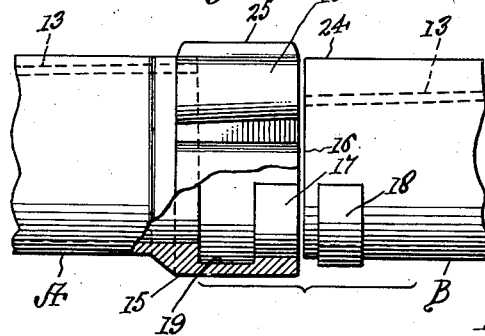
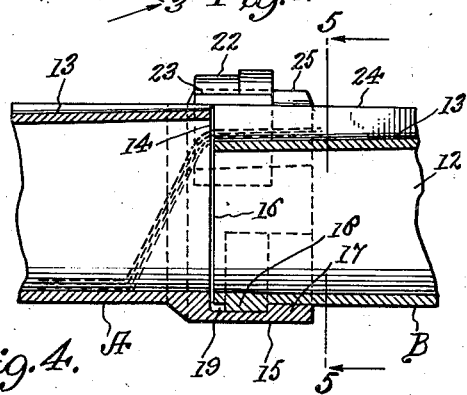
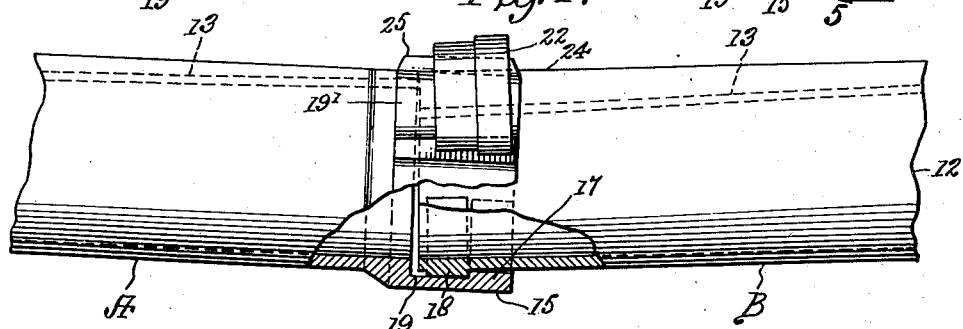
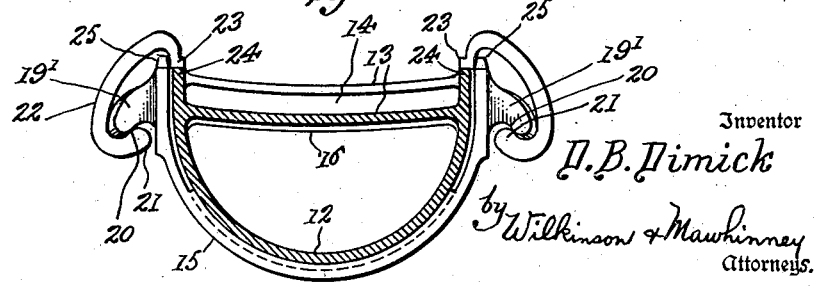
Inventor
D. B. Dimick
by Wilkinson & Mawhinney
Attorneys.

Nov. 1, 1938.  D. B. DIMICK  2,135,103
LOCK JOINT SUBDRAINAGE PIPE
Filed Jan. 4, 1938  2 Sheets-Sheet 2
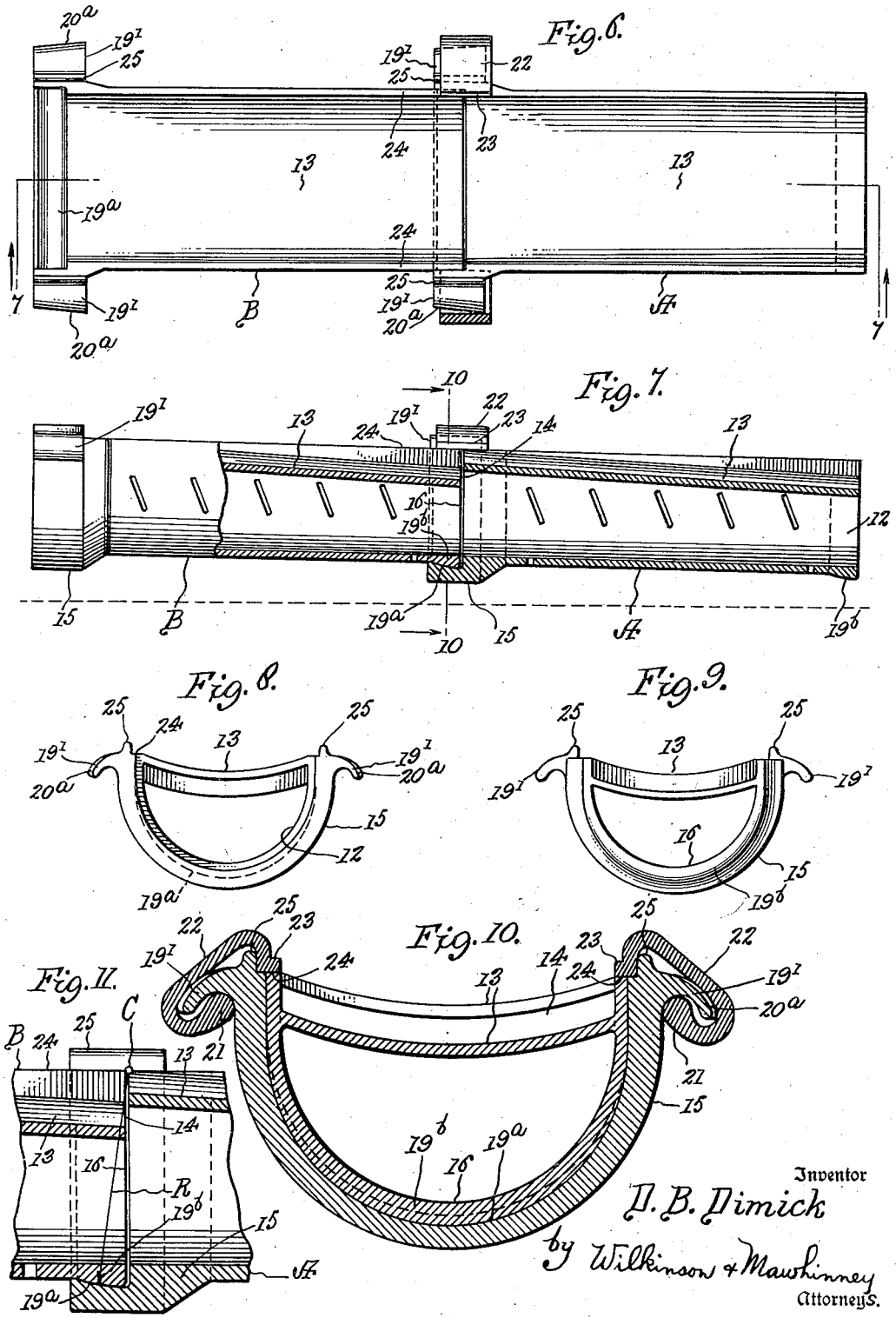
Inventor
D. B. Dimick
by Wilkinson & Mawhinney
Attorneys.

Patented Nov. 1, 1938

2,135,103

UNITED STATES PATENT OFFICE 2,135,103

LOCK-JOINT SUBDRAINAGE PIPE

Daniel B. Dimick, Newton, Mass.

Application January 4, 1938, Serial No. 183,353

5 Claims. (Cl. 61—11)

The present invention relates to improvements in lock-joint subdrainage pipe and has for an object to provide an improved connection or joint between sections of subdrainage pipe that will act to hold the sections of pipe together against any likelihood of separation, while at the same time allowing of a certain flexibility between the pipe sections incident to the uneven settling of the ground, abnormal localized superimposed weights and other causes.

The invention also contemplates the provision of an improved joint in which the items of simplicity and economy in manufacture are taken largely into account, together with the further feature that the pipe sections may be assembled and locked together easily and quickly in trenches or other places where clearance and operating room are limited.

A further object of the invention is to provide both internal and external locking devices for the pipe sections, neither of which interfere with one another in the adjustment of each pipe section due to locking conditions, and both of which contribute jointly to the single purpose of securing the pipe sections together against separation in such a snugly set-up relation as to avoid leakage at the points.

With the foregoing and other objects in view, the invention will be more fully described hereinafter, and will be more particularly pointed out in the claims appended hereto.

In the drawings, wherein like symbols refer to like or corresponding parts throughout the several views.

Figure 1 is a fragmentary perspective view showing an improved lock-joint subdrainage pipe constructed according to the present invention.

Figure 2 is a side view, with parts broken away and parts shown in section with the pipe sections disassembled.

Figure 3 is a longitudinal vertical sectional view taken on the line 3—3 in Figure 1 and with the parts assembled.

Figure 4 is a side view, with parts broken away and parts shown in section of two sections of pipe joined together by the improved joint and indicating the flexible character thereof.

Figure 5 is a vertical transverse section taken on the line 5—5 in Figure 3.

Figure 6 is a top plan view of a slightly modified form of the invention.

Figure 7 is a longitudinal vertical section taken on the line 7—7 in Figure 6.

Figure 8 is an end view as seen from the bell end of one of the pipe sections.

Figure 9 is a similar view from the spigot end.

Figure 10 is a vertical section, taken on an enlarged scale, on the line 10—10 in Figure 7, and Figure 11 is an enlarged vertical section of the joint shown in Figure 7 and illustrating the radius of curvature and radius of relative movement of the flexible connected sections.

Referring more particularly to Figures 1 to 5, A and B represent two adjoining sections of subdrainage pipe constructed in accordance with the present invention in metal, clay or other appropriate material. These sections may be each composed of a semi-circular or other form of wall 12 between the upper portions of which is supported a cradle or top wall 13. The cradle preferably slopes from end to end of its pipe section whereby the lower end of one cradle will extend vertically beneath the adjacent higher end of the cradle of the adjacent section, thus producing an elongated slot or gap 14 leading from the upper surface of the cradle 13 of a higher pipe section B through the slot into the interior of the next lower or carry-off section A.

As shown in Figure 3, the water which settles upon the cradle 13 of section B descends through gap or slot 14 in a cascade effect downwardly into the interior of the pipe section A, thus stirring up the fluid material in the subdrainage pipe and having a self-clearing action so as to avoid the stopping-up of the slot 14.

The bell end of the pipe A is indicated at 15, while at 16 is shown the spigot end of the pipe section B. Pads 17 and 18 are cast or otherwise produced upon the bell and spigot. These pads will extend preferably in a circumferential direction about one-third the normal diameter of the pipe, although this is not essential. The pad 17 on the bell 15 is at the outer portion of the bell. Inside the pad is formed thereby a depression 19 into which the complemental pad 18 of the bell 16 fits as indicated in Figure 3. In separated position the parts are shown in Figure 2. The pads 17 and 18 constitute the internal locking device.

The external locking device is composed of ears and clips which cooperate to hold the spigot 16 down in the bell 15, and prevent the pad 18 from lifting and clearing over the pad 17, such as would be necessary to separate the ends of the pipe sections. The ears are indicated at 19' and they taper from one end to the other. These ears are upon the outside upper portions of the bell 15, being two in number and located at substantially diametrically opposite points near the upper part of the pipe. As best shown in Figure 5, the ears 19 have lower incurved surfaces 20 to form sliding interlocking connection with the lower jaws 21 of the malleable clips 22. The ears 19' or the incurved lower surfaces 20 thereof, are tapering from end to end. That is the ears progress in thickness from one end to the other. This condition is shown in Figure 2 in which the smaller dimension of the ears is shown to the right and the larger dimension at the inner end of the bell 15. Thus when the malleable clips 22 are driven onto the ears, a binding effect is created due to the wedge action produced by the ears and the clips. This wedge action causes the other jaws 23 of the clips 22 to press down upon the upper edges or curbings 24 of the spigot 16 thus holding the pad 18 down in the socket or depression 19 and behind the companion pad 17. In other words, the inner surface 20 is higher at one end than it is at the other. The higher end is at the free end of the bell 15. The same result could be produced of course if the taper was upon the claw or jaw 21 of the clip 22. The upper claw or jaw 23 rides within an upstanding rib 25 on the bell. This rib 25 guides the clip and in conjunction with the ear 19', which from Figure 5 will be shown to extend outwardly and downwardly from the side of the bell, coacts to bind the jaws of the clip 22 in place upon the joint. The clip 22 may be slid horizontally from the higher or narrower end of the ear 19' and driven by hammer blows towards the other thicker or lower end. In other words the hammer blows will act to wedge the clip 22 upon the ear 19' and upon the rib 25 and the curbing 24 of the spigot 16. The same result could be secured by having the inclination or wedge formation on clip 22. The malleability of the clip 22 enables the same to be forced onto the cast iron pipe joint without likelihood of danger of breakage to either. Moreover, such a clip will possess a certain amount of elasticity which will enable the parts to be put under great pressure and tension. Thereby a positive lock is produced for the joint without, however, interfering with the deflection of one pipe section with respect to another which is owing to the use of the malleable iron clips.

At the same time the joint possesses a certain rigidity that will prevent the casual or accidental separation of the pipe sections and will avoid leakage. The malleable iron clip may be put in a vise and adjusted as by opening or closing the jaws 21 and 23 thereof to greater or lesser extent, whereby the clips are made to conform to the deflection in the pipe sections which they act to couple together.

The requirement of such a lock-joint feature is due to the fact that in railroad work before the construction has consolidated there may be a movement of the material which causes a concentrated load on the pipe tending to cause it to separate. The lock-joint will hold the sections together. At the same time it is very desirable to have a lock-joint which will yield rather than one which is wholly rigid. The value of the construction consists in the fact that it is positive in locking the pipe together but constructed so that the joint will yield or deflect under pressure. The arrangement of the internal and external locking devices gives a remarkably flexible joint.

Referring more particularly to Figures 6 to 11, the same construction is illustrated with the exception that the pads 17 and 18 are replaced by a sunken or depressed area 19a of the bell and a convex or raised portion 19b on the spigot. In order to obtain flexibility the two sections should be able to move together on the line of curvature between the parts 19a and 19b. This might be styled the lobe curve, the center of which is at C and the radius line being indicated at R. This radius R should be constant throughout the curved surfaces at 19a and 19b. In other words, the curvature between the meeting surfaces of parts 19a and 19b should be struck from the common center C. Thus the pipe sections can shift with respect to one another in the manner indicated in Figure 4. In other words, the pipe sections are in this sense said to be flexible at the joint.

Now it will be noted from Figure 10 that the concave and convex parts 19a and 19b extend up and around from the bottom of the pipe only about half way. In other words, these interfitting parts 19a and 19b do not go all the way up on both sides of the pipe section. The center C at the spigot end acts as a fulcrum and the pipe tends to sag downward, creating a sliding movement at the arrow point, preventing a swivel effect without breaking loose at the joint.

In the form shown in Figure 6, the taper 20a is shown upon the outside lateral or horizontal surface of the ear 19'. This will have a tendency to wedge and lock the clip in place but it will not have the effect to force vertically downward the jaw 23 upon the spigot. The preferred construction is shown in Figures 1 to 5 in which this vertically downward movement is the result of the wedge action. The vertically downward movement binds the pad 18 of the spigot into the recess 19 and back of the bell pad 17.

In Figures 6 to 11, it is assumed that a proper interfitting relation already obtains between parts 19a and 19b before putting the clips in place. Therefore, any binding action of the clips, even an outward horizontal binding action, will suffice as the clips will then hold the spigot end from lifting out of the previously engaged position of the interfitting parts 19a and 19b.

It is obvious that various changes and modifications may be made in the details of construction and design of the above specifically described embodiment of this invention without departing from the spirit thereof, such changes and modifications being restricted only by the scope of the following claims:

What is claimed is:

1. A subdrainage half-round pipe comprising adjoining pipe sections with interfitting half bell and spigot, said pipe sections having substantially semi-circular bottom walls and flat top cradles, interfitting parts on the overlapping half bell and spigot, ears on the outside of the half bell, ribs upstanding from said half bell, and malleable clips slidably engaged upon said ears and over said ribs and having claws, one claw engaging beneath the ear, the other claw engaging upon the upper side of the semi-circular wall and within said rib, said clip and ear having wedge surfaces therebetween.

2. In a subdrainage pipe composed of a plurality of pipe sections, each section being composed of a substantially semi-cylindrical bottom wall and a substantially flat top wall sloping from end to end of the pipe section, said pipe sections having upstanding curbings at the lower ends of said top walls, said pipe sections having half bell portions projecting from the higher ends of the top walls for enveloping the deep curbings of the half spigot ends of the adjacent pipe sections, said half bells having ribs projecting upwardly therefrom outwardly of the deep curbings of the half spigot ends, projections on the outer parts of the half bell ends, and slidable means cooperating with said projections and having wedge surfaces therebetween, said means having jaws guided by said ribs and slidably engaging upon the upper surfaces of said deep curbings.

3. In a subdrainage pipe composed of a number of similar pipe sections, each said section composed generally of a substantially semi-cylindrical bottom wall and a flat top wall sloping from end to end of the section, each section having a half spigot end and a half bell end for receiving the half spigot end of an adjacent pipe section, said pipe sections having curbings extending above the flat top wall, said flat top walls forming gaps therebetween at the assembled half bell and spigot ends of two adjacent pipe sections, ribs upstanding from the half bell ends outwardly of said curbings and upwardly above the curbings, projections on the outer substantially diametrically opposite portions of the half bell ends, and malleable means slidably mounted with respect to said projections, said projections and malleable means having wedge surfaces therebetween, said malleable means having jaws extending within and guided by said ribs and slidable directly in contact with said curbings.

4. In a subdrainage pipe composed of a plurality of pipe sections, each such pipe section including a substantially semi-circular bottom wall and a sloping top wall with curbings upstanding above said top wall, said pipe sections having half spigot and half bell ends for fitting together to join two adjacent pipe sections together, the half spigot end of one pipe section fitting into the half bell end of an adjacent pipe section by movement of the pipe sections at right angles to one another, said half bell and spigot ends having internal interlocking parts interfitted by said right angular rectilinear movement and withdrawn in the same manner, ribs on the free ends of the half bell portions extending upwardly beyond said curbings, projections on the half bell portions just below said ribs, and malleable clips slidably and interlockably engaged with said projections, said projections and clips having wedge surfaces therebetween, said clips also having jaws riding within and guided by said ribs and slidable in contact with said curbings.

5. In a subdrainage pipe composed of pipe sections of substantially semi-cylindrical form having cradle top walls for collecting drainage water, said top walls having gaps therebetween at the meeting portions of said pipe sections to permit the infiltration of the drainage water into the interior of the pipe, said pipe sections having interlocking portions at the meeting parts of the pipe sections, said interlocking portions having a limited relative movement in a direction axially of the pipe sections for permitting of the angular adjusting tilting movement of one pipe section with respect to another, and means for detachably binding said interlocking portions in the interlocking relation, said means being in substantial alignment with said interlocking portions in a direction transversely of the pipe whereby said means will not interfere with the rocking or tilting movement of one pipe section with reference to another.

DANIEL B. DIMICK.